United States Patent [19]
Ward et al.

[11] Patent Number: 6,061,100
[45] Date of Patent: May 9, 2000

[54] NOISE REDUCTION FOR VIDEO SIGNALS

[75] Inventors: Rabab K. Ward; Julong Du, both of Vancouver, Canada; Pingnan Shi, Indianapolis, Ind.; Xiaoli Li, Vancouver, Canada

[73] Assignee: The University of British Columbia, Vancouver, Canada

[21] Appl. No.: 08/941,238

[22] Filed: Sep. 30, 1997

[51] Int. Cl.$^7$ .................................................. H04N 5/21
[52] U.S. Cl. ......................... 348/607; 348/620; 348/700
[58] Field of Search ................................. 348/607, 618, 348/619, 620, 621, 622, 623, 699, 700, 701, 668, 669, 451, 452; H04N 5/21

[56] References Cited

U.S. PATENT DOCUMENTS

| | | |
|---|---|---|
| 4,240,106 | 12/1980 | Michael et al. . |
| 4,661,853 | 4/1987 | Roeder et al. . |
| 5,166,788 | 11/1992 | Lee . |
| 5,191,419 | 3/1993 | Wischermann ........................ 348/620 |
| 5,268,760 | 12/1993 | Suyama .................... 348/620 |
| 5,400,083 | 3/1995 | Mizusawa ............................... 348/620 |
| 5,594,499 | 1/1997 | Watanabe et al. ...................... 348/222 |
| 5,638,139 | 6/1997 | Clatanoff et al. ...................... 348/700 |

Primary Examiner—Michael H. Lee
Attorney, Agent, or Firm—C. A. Rowley

[57] ABSTRACT

A method of reducing noise in video signal, by processing the pixels of a process frame of video signal in conjunction with a selected number of previously processed frames to determine values for target pixels in the process frame by applying a temporal motion detector to determine whether a target pixel has a still or motion status and further processing the pixels with motion status by impulse recognition step to further determine whether the pixel should be classified as having a still or a motion status. The pixels are then checked via a spatial motion detecting step to obtain a motion index value to the pixels and the motion index value is used in a motion adaptive temporal filter to define the pixel value of the still pixel. The motion index value of the pixels is used to set a dynamic threshold in a detailed motion active spatial filter to define the pixel value for the motion pixels. The system may be integrated with a converter box for converting digital signals to analog for use in conjunction with analog television sets services by digital signals.

8 Claims, 11 Drawing Sheets

FIG. 6B $$\hat{p}_{33} = \frac{\sum_{i=1}^{5} \sum_{j=1}^{5} X_{ij}}{\sum_{i=1}^{5} \sum_{j=1}^{5} \left(\frac{X_{ij}}{p_{ij}}\right)}$$

$$X_{ij} = \begin{cases} p_{ij} & \{|p_{ij} - p_{33}| < \text{threshold}\} \\ 0 & \text{otherwise} \end{cases}$$

NOISE REDUCTION FOR VIDEO SIGNALS

FIELD OF INVENTION

The present invention relates to a noise reducing system for providing a noise reduced value pixels in a video signal.

BACKGROUND OF THE INVENTION

Analog cable television systems are susceptible to additive noise impairments, most commonly, thermal noise, composite second order beats and composite triple beats. Digital cable broadcasting has been introduced to solve these problems. However, during the period of migrating from analog systems to full digital systems, alternative techniques are required to bridge the gap of image qualities between the two systems. Video noise reduction is one of the proposed solutions. Among recent inventions, digital image processing related techniques are widely used in reducing video noise. The basic idea underlying most of existing algorithms, and this invention, is to estimate the original value of an impaired signal with redundant data in the neighborhood. As it is well understood that correlation may adhere spatially and temporally, in order to maximize the effectiveness of an algorithm, most systems use both spatial and temporal correlated pixels for the calculation. However, with a limited number of frames of noisy video pictures, it is extremely difficult to conclude whether a difference between contiguous pixels is caused by motion, detail variation or noise, especially when the difference is subtle. Techniques providing detail preservation for spatial filtering and motion preservation for temporal filtering are crucial to the effectiveness of an algorithm. But now, unfortunately, there is no such a practical method that could reduce noise while introducing no artifacts. Available techniques compare themselves to each other with the concept of minimum visible artifacts, which is rather a subjective measure. Combined with signal-to-noise ratio measurement, real-time subjective evaluation is better accepted by industries than instrument measurement results alone as subjective methods are more directly related to temporal characteristics of an algorithm and also the reactions of human eye perception system.

In the past decade, almost all the related systems developed have been focusing on recursive type algorithms which have a direct benefit of saving expensive storage memory. However, the price one has to pay for the memory saving is reduced visual fidelity of the processed image, even though the signal-to-noise ratio measured might show equivalent noise reduction efficiency.

A conventional inter-frame motion detection algorithm, as is well known, assumes a pixel is in a motion area if the difference between the pixel under examination and its corresponding pixel in the history frame is greater than a threshold. It is obvious that the lower the threshold, the less the artifacts are likely to be introduced. However, the lower the threshold, the more chance that a high intensity noise would cause the motion detection logic false alarming. Michael et al. in U.S. Pat. No. 4,240,106 described two motion detectors which overcome some of the deficiencies of the above described basic motion detector. The Michael et al. detector employs an array of pixel differences disposed about the pixel currently being examined for motion. In the first system the respective picture point differences are independently compared to a threshold value to generate bi-level signals corresponding to a majority logic gate which produces a motion signal if the majority of the pixel differences in the array exceed the threshold. In the second system, the pixel differences, of the array of pixels centered about the pixel under examination, are integrated to generate an average difference over the area. The average difference is then compared with a threshold. The object here is to differentiate between noise and movement. It is assumed that the larger the number of picture points integrated, the more likely the noise will average to zero whereas movement remains unattended.

Roeder et al. in U.S. Pat. No. 4,661,853 divide the difference matrix formed by target pixel and its surrounding pixels into several sub-matrices, hence improves the property of detail preservation. However, compared with the Michael et al. detector, Roeder detector is less robust in heavy noise situation as less pixels are involved in the averaging.

All methods cited above try to improve their noise immunity, in the motion area or on the boundary of the motion area, by averaging the differences over certain spatial areas. C. P. Sandbank in his book "Digital Television" gives a complete theoretical analysis on algorithms in this category. As a conclusion draw from this book, compromise has to be made between detail motion sensitivity and noise immunity.

Lee in U.S. Pat. No. 5,166,788 described a motion spread technique to protect motion-still transition area. The invention mainly targets adaptive comb filtering applications. A soft switch between a temporal filter and a paralleled spatial filter is used around the motion boundaries. For noise reduction purpose, a disadvantage of this algorithm is that the spatial filter is virtually idle on the still areas in a video image.

BRIEF DESCRIPTION OF THE PRESENT INVENTION

It is an object of the present invention to implement an economically practical digital video processor which provide adequate visual improvement of video quality in light and heavy noise environment while introducing minimum visible artifacts.

It is another object of the present invention to provide a filter system to reduce noise in video signals.

It is a further object of the present invention to provide an output video signal wherein the values for the pixels are modified to reduce the effects of signal noise.

Broadly, the present invention relates to a method of reducing noise in a video signal comprising providing a process frame with each of its pixels having a digital value applying a temporal motion detection step in sequence to target pixels in said process frame, said temporal motion detection step being based on difference in values between pixels corresponding to said target pixels in said process frame and a selected number of previous frames to define the status of each said target pixel with respect to the previous frames as a still pixel or a motion pixel, further processing each said motion pixel in an impulse recognition step to further define status of said motion pixels as either still pixels or retain their classification as motion pixels based on status of adjacent pixels in said frames, subjecting said target pixels to a spatial motion detection step based on weighting of statuses of target pixel adjacent pixels in said process frame and at least one of said previous frames to define a motion index for said target pixel.

Preferably said temporal motion detecting step define status of each said target pixel with respect to each of said previous frame and said spatial motion detection step defines a motion index for said target pixel with respect to each of said previous frames.

Preferably said method further comprises applying a motion adaptive temporal filter to said still pixels to define a pixel value for each of said still pixel, said motion adaptive temporal filter using said motion index values as thresholds.

Preferably said method further comprises subjecting said motion pixels to a detailed motion adaptive spatial filter using a dynamic threshold based on said motion index values for said target pixels being processed.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

The embodiments of the present invention will be described in detail hereinafter with reference to the accompanying drawings, in which the like reference numerals refer to the like parts and the equivalents.

The system does noise reduction pixel by pixel. In this document, the pixel being processed is called the target pixel, and the pixels which have the same position in the history frames are called the corresponding pixels of the target pixel in those frames. The system also utilizes data from previous frames, in the following description of an example of the invention, three frames which are called frame 1, frame 2 and frame 3 in this document, where frame 1 is the nearest past frame, and frame 3 denotes the furthest past frame.

We have found that artifact visibility is noise intensity dependent and we have developed a strategy of using noise level as the threshold for frame difference motion detection instead of being a fixed level predetermined by some artifact tolerance criteria. Our preferred strategy is called "still" detection where we use a fixed threshold. Consider a picture with additive Gaussian noise of N(0, σ), and assume that the threshold is set to the value of 2σ, which denotes two times the standard deviation of the Gaussian noise. Approximately 95% of the pixels in a still image area have a temporal difference less than threshold. False motion alarming occurs with a probability of about 5%. For example, statistically speaking, only one pixel has a chance to exceed the 2σ threshold in a 5×4 still window. To cancel these impulse alike false alarms, an impulse pattern matching scheme will be used. FIG. 3A illustrates the correction logic which will be described in more detail later. The best feature of this scheme is that it will detect very fine detail motion, although it is based on an assumption similar to that of previous inventions that motion will not likely take place in an isolated pixel.

The above "still" detection circuit is unfortunately sensitive to motion in areas with fine details and to ringing effects of moving sharp edges. Ringing effects appear only in vertical direction, however, motion-still transition area tends to create after image in both vertical and horizontal directions. A post-processor is placed after the temporal motion detection to protect moving boundaries. This processing is also effective on a moving object that has a gradual change in its gray level intensity. Different from an average filter, this circuit integrates the product of motion status value and the reciprocal of its distance from the target pixel to estimate the motion index of the pixel (motion index is an indicator of the probability of a pixel being a motion pixel). Although multiplication operations are involved, as they are one bit operations, it is not as complicated as it appears.

An edge/detail adaptive spatial filter follows the above temporal filter. An edge/detail detection circuit examines the pixels in a spatial window with the target pixel in the center and marks the pixels that have a value close enough to that of the center target pixel. The filter averages the marked pixel values and replaces the value of the target pixel by this average. Based on the finding that human eyes are less sensitive to noise in moving details in a picture and that the lower the threshold, the less the chance of possible blurring but the less the noise reduction, the threshold for deciding if the value of a pixel in the window is close enough to that of the target pixel is made motion adaptive, i.e. a higher-than-necessary threshold for motion areas and a lower threshold for still areas are chosen. Using two thresholds, the high threshold for the motion areas and the low threshold for the still areas, the spatial filtering tends to compensate for the difference in noise reduction between the motion and the non-motion areas resulting from our previous temporal still-only filtering. Soft switching between the motion threshold and the still threshold is employed here to make the image after processing more natural-looking.

Figure 10:
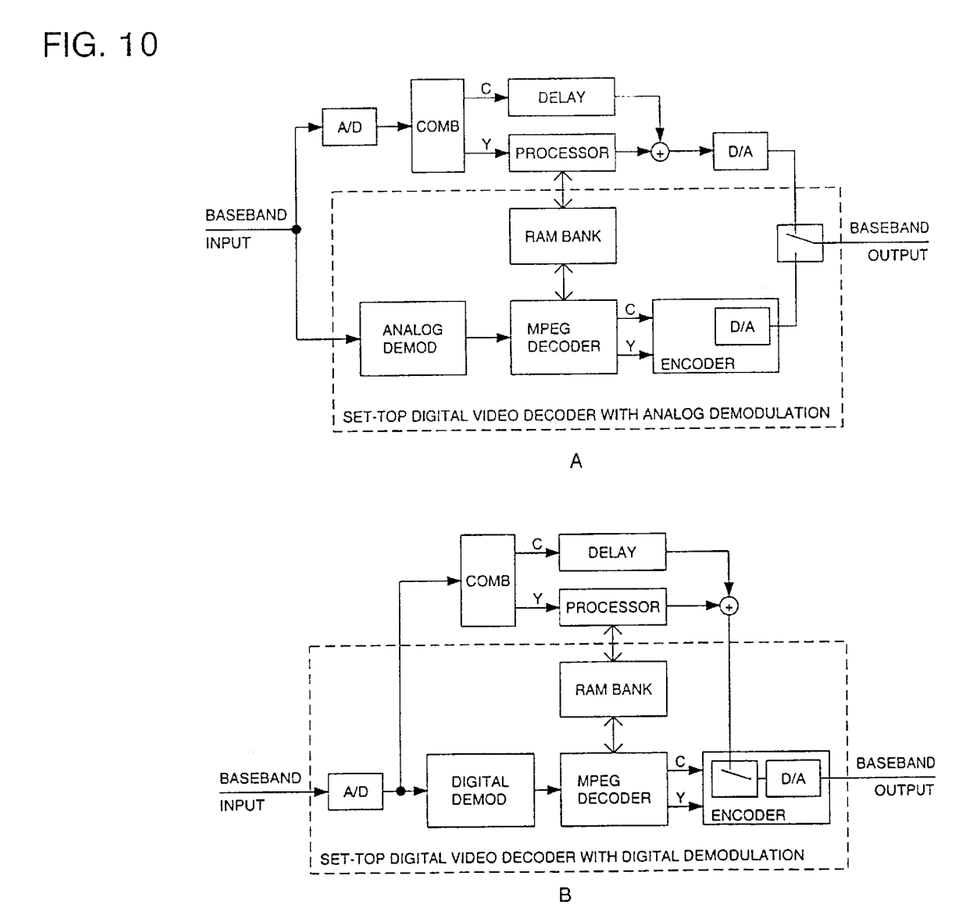
FIG. 10 presents application examples that propose how the processing unit fits into a set-top box with analog and digital demodulation, respectively.
Figure 11:
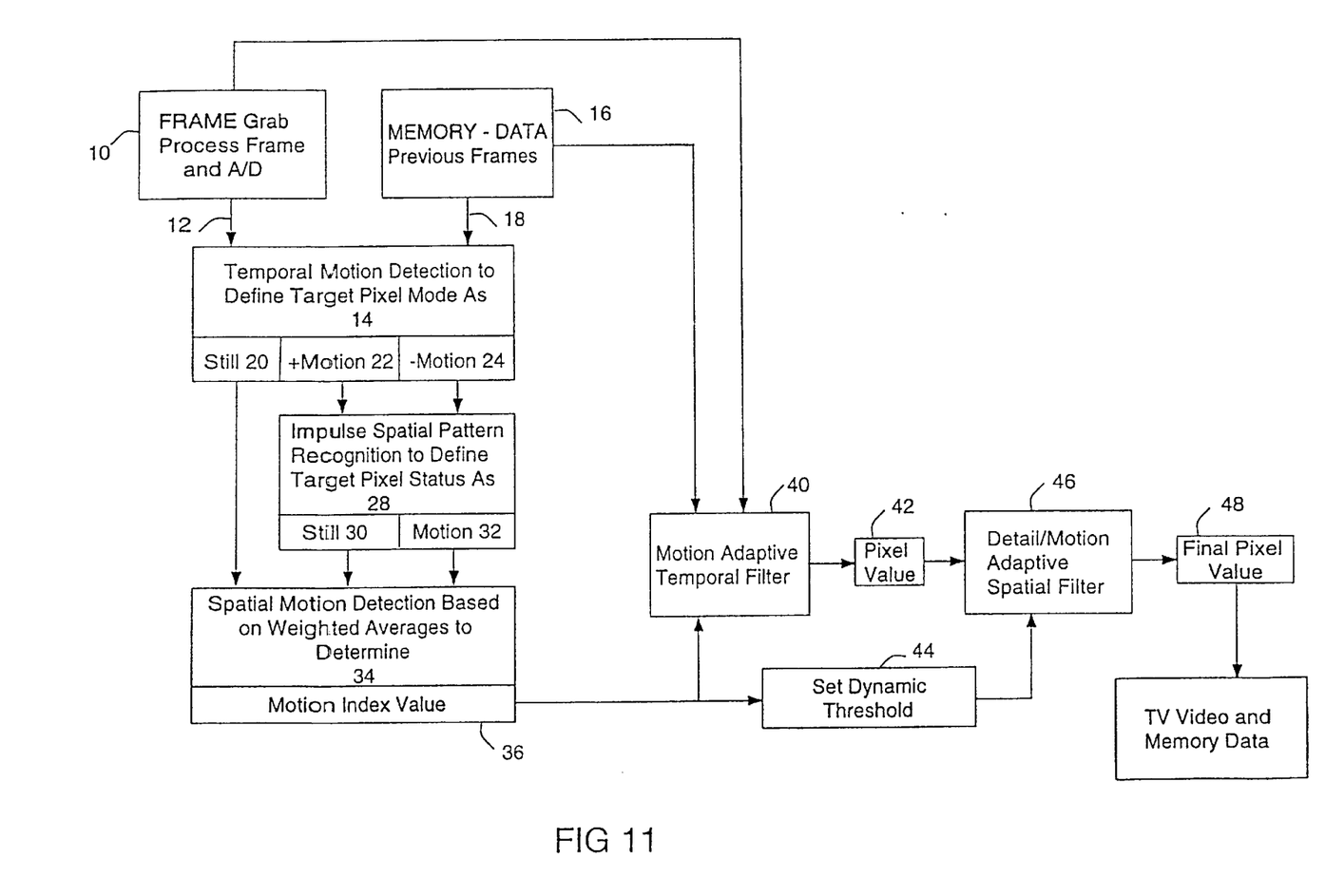
FIG. 11 is a schematic flow diagram illustrating the method of the present invention.

Before describing the invention in detail with respect to FIGS. 1 to 10, attention is directed to FIG. 11 which illustrates the operation of the present invention.

As shown, the first step as indicated at 10 is to grab a frame and convert it from analog to digital, if necessary, and provide the digital output with a gray scale value for each of the pixels in the frame. The information on the process frame, i.e. the frame currently being processed, is fed as indicated by the arrow 12 to a temporal motion detection step 14 to which is also fed from memory 16 as indicated by arrow 18 data on previous frames which for the purpose of this description, designated as frames 1, 2 and 3. However, any reasonable number of such previous frames may be used in the process. The temporal motion detection step 14 and its operation will be described in more detail hereinbelow with respect to FIG. 2. This step in the process is intended to provide a first definition of the pixel status of the target pixel being processed and outputs the pixel as being either still as indicated at 20 or positive motion at 22 or negative motion as indicated at 24.

Figure 3:
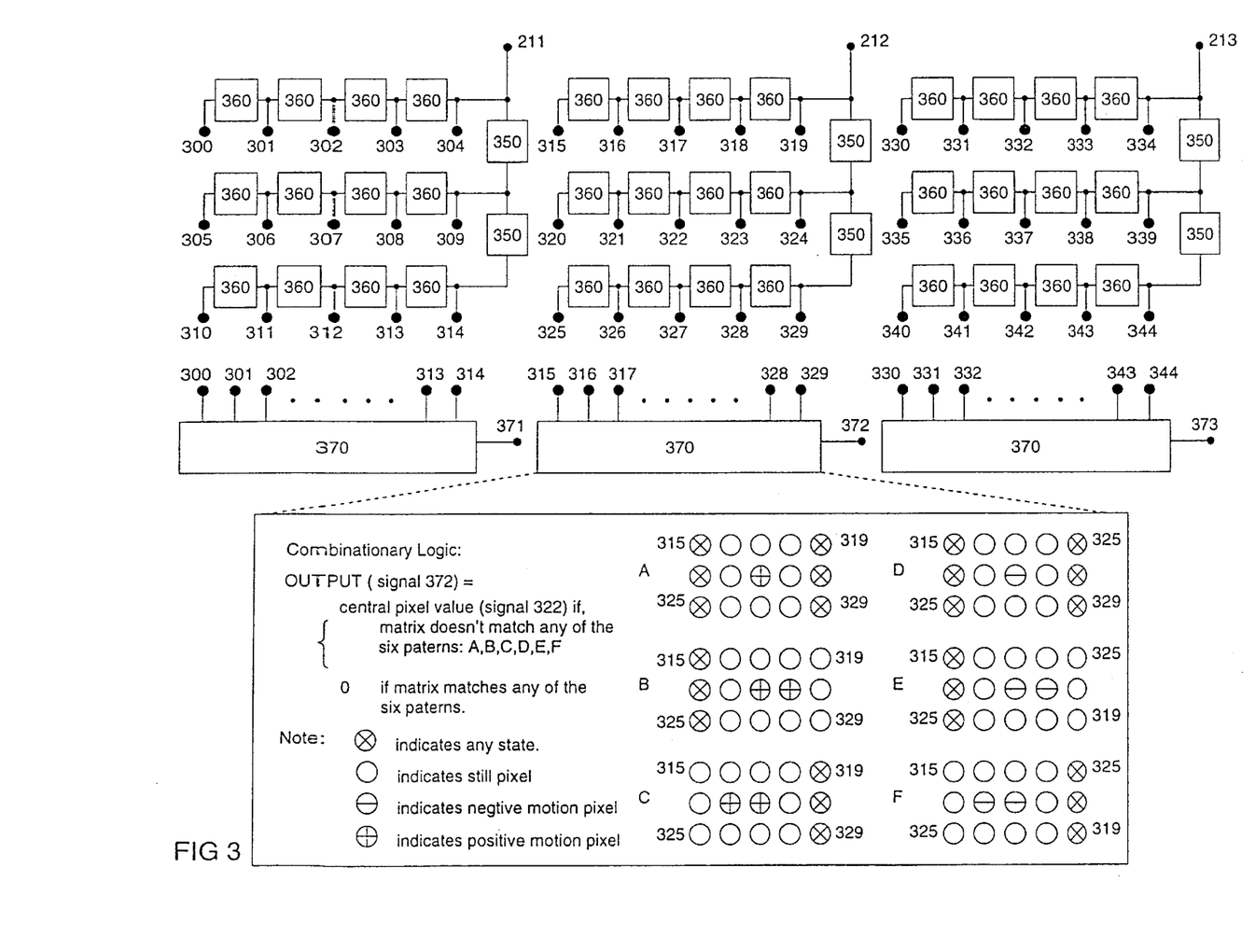

Obviously, mistakes may be made and to better ensure that those pixels as indicated at 22 and 20 as containing motion are further processed in an impulse spatial pattern recognition step as indicated at 28 (as described more fully with respect to the example shown in FIG. 3) to again further define the status of the target pixel as still as indicated at 30 or motion as indicated at 32.

The pixels are further process to ensure proper values are applied to the pixels before they are reconverted to analog for video projection. This is accomplished in the present invention by processing the pixels whose status has been defined as indicated at 20, 30 and 32 in the spatial motion detection system 34 to define a motion index value as indicated at 36 based on weighted averages for adjacent pixels to the target pixels in the process frame and proceeding frames as described in more detail in the following example with respect to FIG. 4.

The motion index value 36 is then used in conjunction with the motion adaptive temporal filter as indicated at 40 to process the pixels and provide a pixel value 42 for each of the target pixels as will be described in more detail hereinbelow with respect to FIG. 5.

The motion index value 36 is used to set a dynamic threshold 44 which is applied to the pixel values 42 in a detailed motion adaptive spatial filter system or step 46 to define a final pixel value 48 for each of the target pixels which is then use to produce the picture. The detailed motion adaptive special filter 46 is described in more detail in conjunction with FIGS. 6, 7 and 8.

Figure 2:
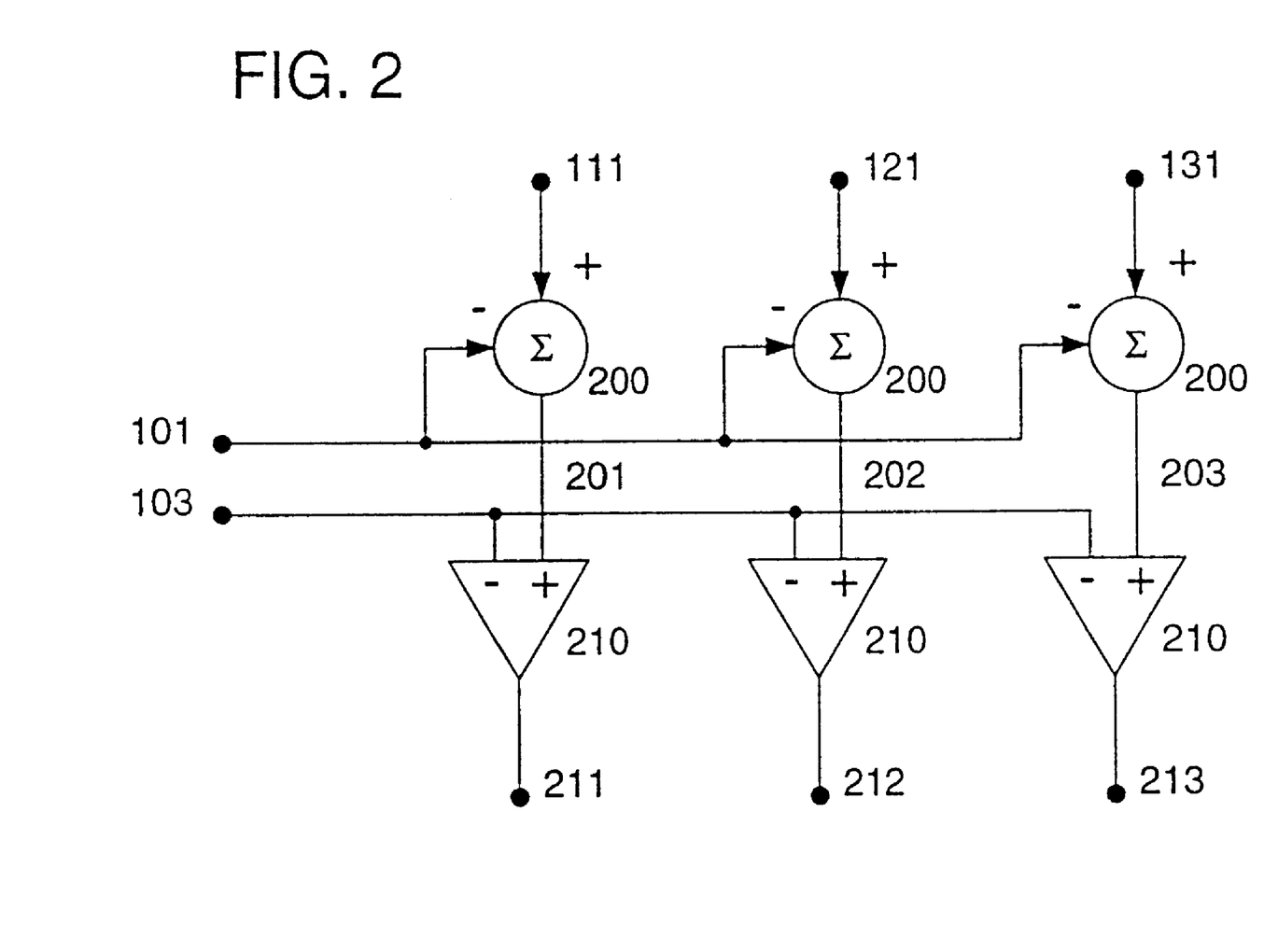
FIGS. 2, 3, 4 describe the motion detection, still correction and motion post processing circuits.
Figure 4:
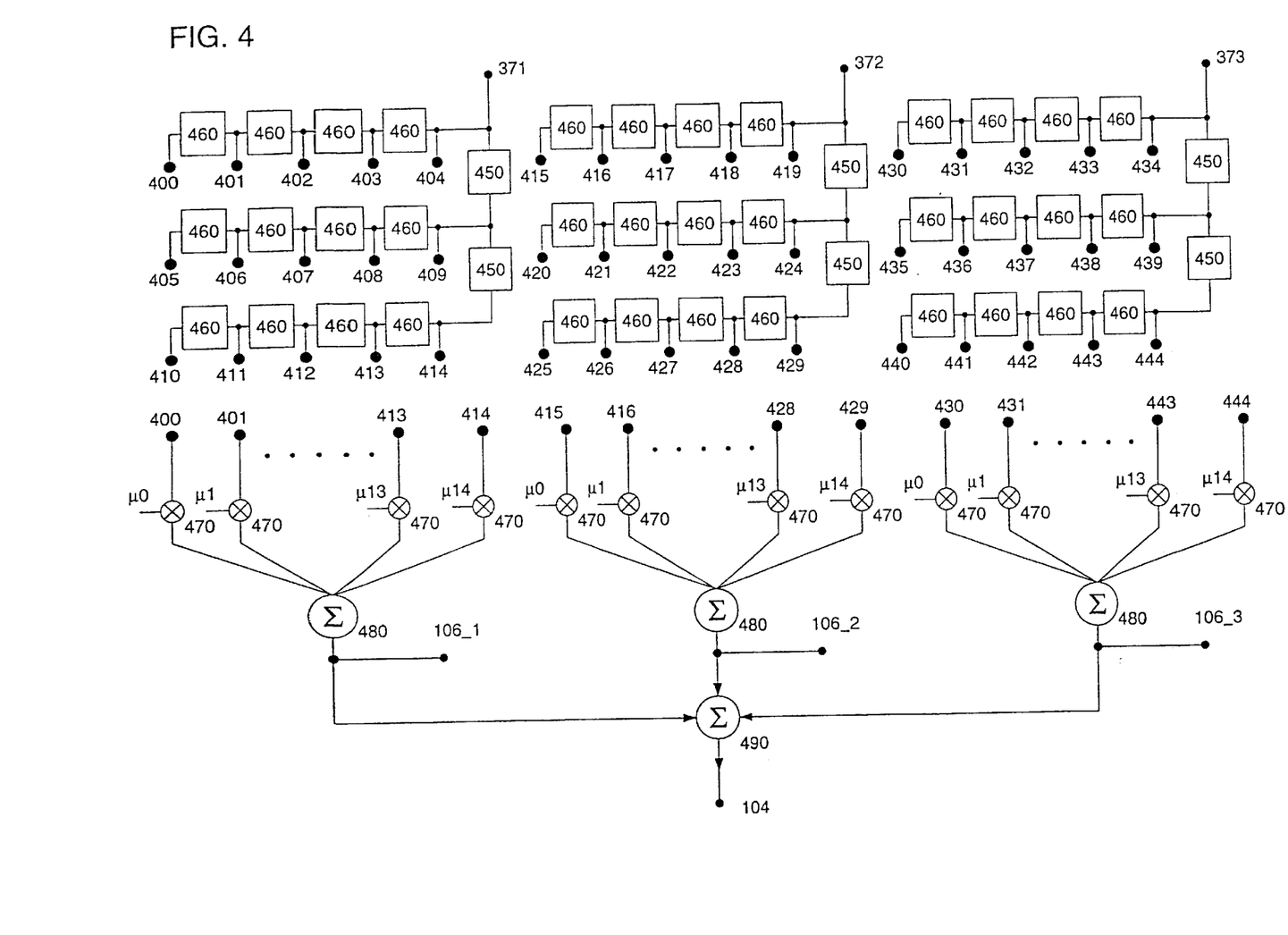

The present invention, see FIG. 11, comprises a motion adaptive temporal filter (FIG. 5), detail/motion adaptive spatial filter (FIGS. 6 and 7), a motion detector with impulse pattern recognition and motion boundary protection circuitry (FIGS. 2, 3, 4). FIG. 10 shows two examples that fit the noise reduction device into digital TV set-top decoders with digital and analog demodulation circuits, respectively.

Figure 1:
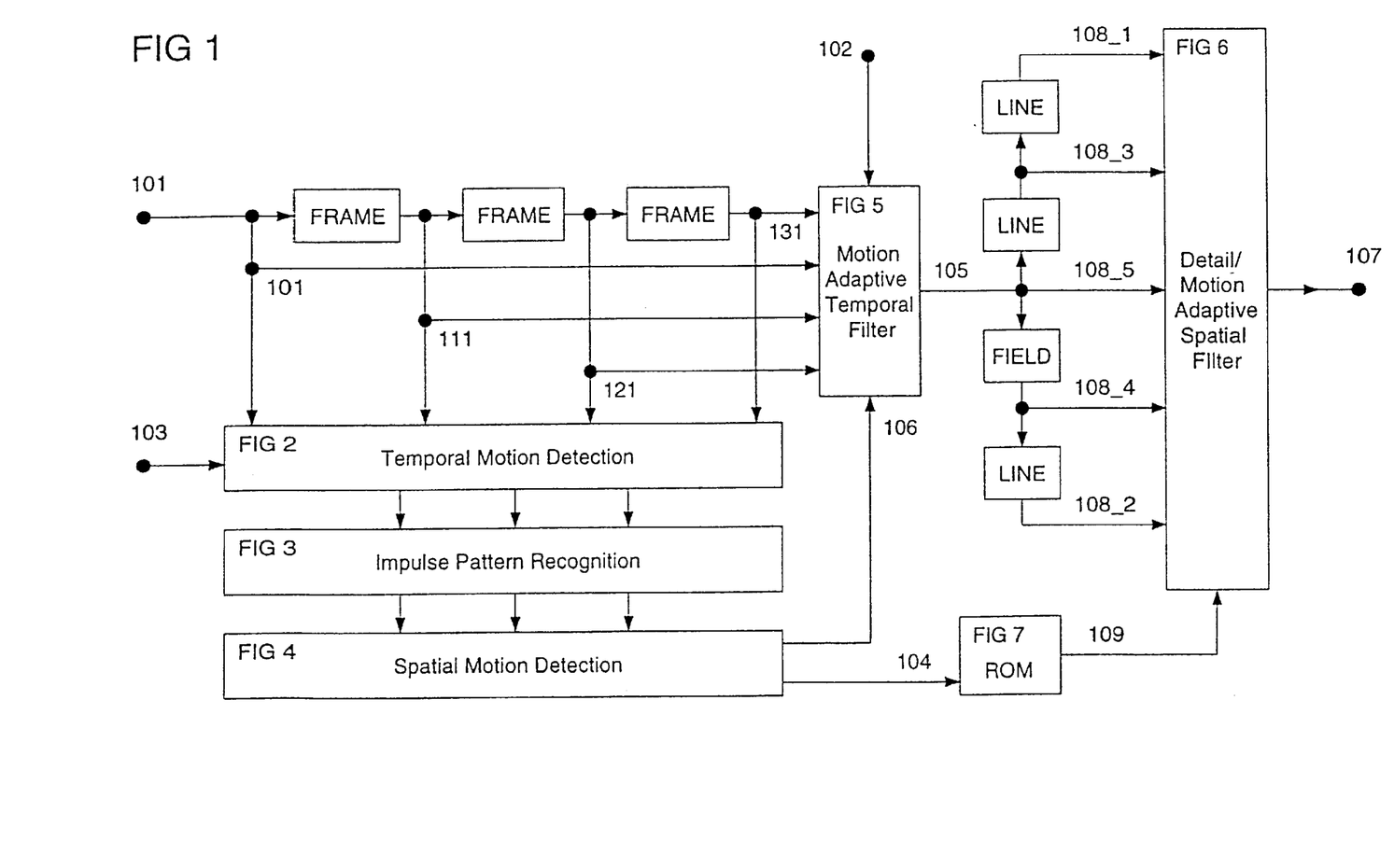
FIG. 1 is an exemplary block diagram of the non-recursive noise reduction system including temporal motion adaptive and spatial motion/detail adaptive processing circuits.

FIG. 1 is a block diagram showing the system structure of this invention for video noise reduction. In FIG. 1, reference numeral 101 denotes a digitized component video signal as the input to the noise reduction system. The three cascaded frame buffers delay the input so that at anytime signals from the past three frames are also available. Reference numeral 111, 121 and 131 denote the signal of frame1, frame2 and frame3, respectively. The four signals 101, 111, 121 and 131 are supplied to the motion detection circuit and the motion adaptive temporal filter. The motion detection circuit consists of three function blocks: temporal motion detection, impulse pattern recognition and spatial motion detection. Each block accomplishes one stage of motion detection and is described in detail in FIGS. 2, 3 and 4, respectively. The motion detection circuit outputs signal 106 which controls the motion adaptive temporal filter and outputs signal 104 which is further converted to the threshold 109 used in the detail/motion adaptive spatial filter (FIGS. 6, 7). The output from the temporal filter (FIG. 5) is fed into a delay structure which delays the incoming signal to five vertically successive lines in a frame. Signals 108_1, 108_3 and 108_5 are in the current field, signals 108_2 and 108_4 are in the field which is delayed by one field from the current field. Since the TV signal is interlaced, in a frame, the line where signal 108_2 abides appears between the two lines where signal 108_1 and signal 108_3 abide respectively. The line where signal 108_4 abides appears between the two lines where signal 108_3 and 108_5 abide respectively. The output from the spatial filter, signal 107, is the final processed output signal of this invented system.

Motion Detection

The motion detection circuit is described more specifically as follows, referring to FIGS. 2, 3 and 4. The detection consists of three stages: temporal motion detection, impulse pattern recognition and spatial motion detection.

Temporal Motion Detection

Temporal motion detect circuit detects motion by comparing the differences between the target pixel and its corresponding pixel in each of the past three frames with a threshold. In FIG. 2, the subtracter circuit 200 subtracts the target pixel signal 101 from signals 111, 121 and 131, which are its corresponding pixels in frame1, frame2 and frame3, respectively. The difference signals 201, 202 and 203 are applied to the comparator circuit 210, where they are compared with a threshold 103. The input-output relationship of each comparator circuits can be described by the equation below, where a difference signal 201 or 202 or 203 is denoted as $\Delta$.

$$\text{Motion Mode} = \begin{cases} \text{still} & \text{if } |\Delta| \leq \text{threshold} \\ \text{positive motion} & \text{if } \Delta > +\text{threshold} \\ \text{negative motion} & \text{if } \Delta < -\text{threshold} \end{cases}$$

Motion mode may take one of 3 values, motion status as will be more full discussed below may take on 2 values.

If $|\Delta|$ the absolute difference between the target pixel and its corresponding pixel in a past frame is greater than the threshold, the target pixel is considered as in motion with respect to this past frame. Signals 211, 212 and 213 indicate the motion mode of the target pixel with respect to frame1, frame2 and frame3, respectively.

The motion mode for each pixel could be one of the following three: still, positive motion and negative motion. The outputs 211, 212 or 213 from the comparator circuits 210 are 2-bit signals with one bit indicating whether or not the target pixel is in motion, and the other bit indicates the polarity of the motion if the target pixel is in motion.

Impulse Pattern Recognition

The temporal motion detection (FIG. 2) is sensitive to noise, which means noise in the video signal may cause errors in the motion detection results. With noise superimposed, a still pixel can be falsely detected as a motion pixel, and on the other hand, a motion pixel can also be falsely detected a still pixel. The function of the impulse pattern recognition logic (FIG. 3) is to correct the error when a still pixel is mistaken as a motion pixel. The theory that the impulse pattern recognition is based on is that higher-than-threshold noise appears randomly in the image as impulses, but video images are coherent which means each pixel is related to its surrounding pixels. By examining the correlation of the target pixel with its surrounding pixels, the wrongly detected motion caused by noise can be fixed.

The pattern recognition circuit analyzes the neighboring area of the target pixel e.g. a 5×3 window, forms a 5×3 matrix of the motion modes of each pixel and detects if the matrix fits one of the six patterns shown in FIG. 3. The central element in each of these matrixes corresponds to the target pixel or its corresponding pixel. The six patterns represent the cases when the motion status of one pixel or two adjacent pixels in the center of the window is not coherent with the motion status of their surrounding pixels. When the central pixel is in positive motion, and their surrounding pixels are either still or in negative motion, or, when the central pixel is in negative motion, and their surrounding pixels are either still or in positive motion, the motion of the central pixel is considered to be erroneous i.e. the motion of the target pixel is considered to have been falsely detected by the temporal motion detection circuit. It is most likely caused by high peak noise.

A 5×3 matrix whose central pixel is the target pixel can be implemented e.g. by using pixel delay elements 360s and line delay elements 350s, which are constructed as in FIG. 3. The matrix elements 300 to 314 are the values of the motion modes with respect to frame1 of the pixels in the 5×3 window of the present frame. They are supplied to a combinational logic 370. The logic 370 performs the pattern recognition with the six different patterns, and corrects the false motion detection, if there is any. The 1-bit output signal 371 indicates the decision on the motion status of the target pixel: either a still status or a motion status. If the matrix fits one of the six patterns in FIG. 3, the output 371 declares that the central pixel is a still pixel and in this example the output 371 takes a value=0. Otherwise the output 371 takes the same "still" or "motion" status value of the central pixel i.e. if signal 307 indicates positive motion or negative motion, the logic 370 outputs that the central pixel is a "motion" pixel and the output 371 takes the value=1. If signal 307 indicate still pixel, the logic 370 outputs that the central pixel is a "still" pixel and 371 takes a value=0.

Similarly, the output signals 372 and 373 indicating motion status of the target pixel with respect to frame2 and frame3 respectively are obtained.

Spatial Motion Detection

To correct another type of error which happens when a motion pixel is mistaken as a still pixel because of the presence of heavy noise, the spatial motion detection is invented.

The spatial motion detection circuit calculates a motion index value on an m×n matrix whose elements are equal to the values 0 or 1 and represent the motion status of the pixels. The central element in this matrix is the motion status of the target pixel.

FIG. 4 shows an example of spatial motion detection on a 5×3 matrix. The 5×3 matrices can be implemented e.g. using pixel delay elements 460s and line delay elements 450s, which are constructed as in FIG. 4. Matrix elements 400 to 414 are the motion status signals with respect to frame1. Each element in the matrix, 400 to 414 is multiplied by a weight factor i(i=0, 1 . . . 14) through a multiplier circuit 470. The weight factors can be properly adjusted for better performance according to the specific application. Typically, the weight factor for a pixel is inversely proportional to the distance between this pixel and the target pixel. The weighted elements are added together in adder 480, and the sum 106_1 forms the "motion index" value of the target pixel with respect to frame1. Motion indices values for the target pixel with respect to frame2 and frame3, denoted as 106_2 and 106_3, are obtained by similar circuits. Along with 106_1, they are grouped and denoted as 106 in FIG. 1, and are used to control the motion adaptive temporal filter. The average of 106_1, 106_2 and 106_3 which is denoted as 104 is used to control the detail/motion adaptive spatial filter.

The motion index value for a pixel does not only depend on its own motion status, it also depends on the motion status of its surrounding pixels. Thus if a pixel is detected as a still pixel while its surrounding pixels are in motion, then its motion index value will be high indicating it has higher probability of being a motion pixel and less probability of being a still pixel. This case often happens when noise is present. Therefore, the spatial motion detection represents a more accurate motion estimation mechanism which is especially effective in protecting the boundary of a moving area from artifacts.

Motion Adaptive Temporal Filter

The basic idea behind noise reduction of this filter is based on the facts that, in stationary video sequences, noise causes the only difference between successive frames, and the noise is random with zero mean. The temporal filter averages the target pixel with those corresponding pixels in the previous frames for which it is relatively detected as a still pixel, and therefore achieves noise reduction without impairing the spatial resolution of the picture.

Figure 5:
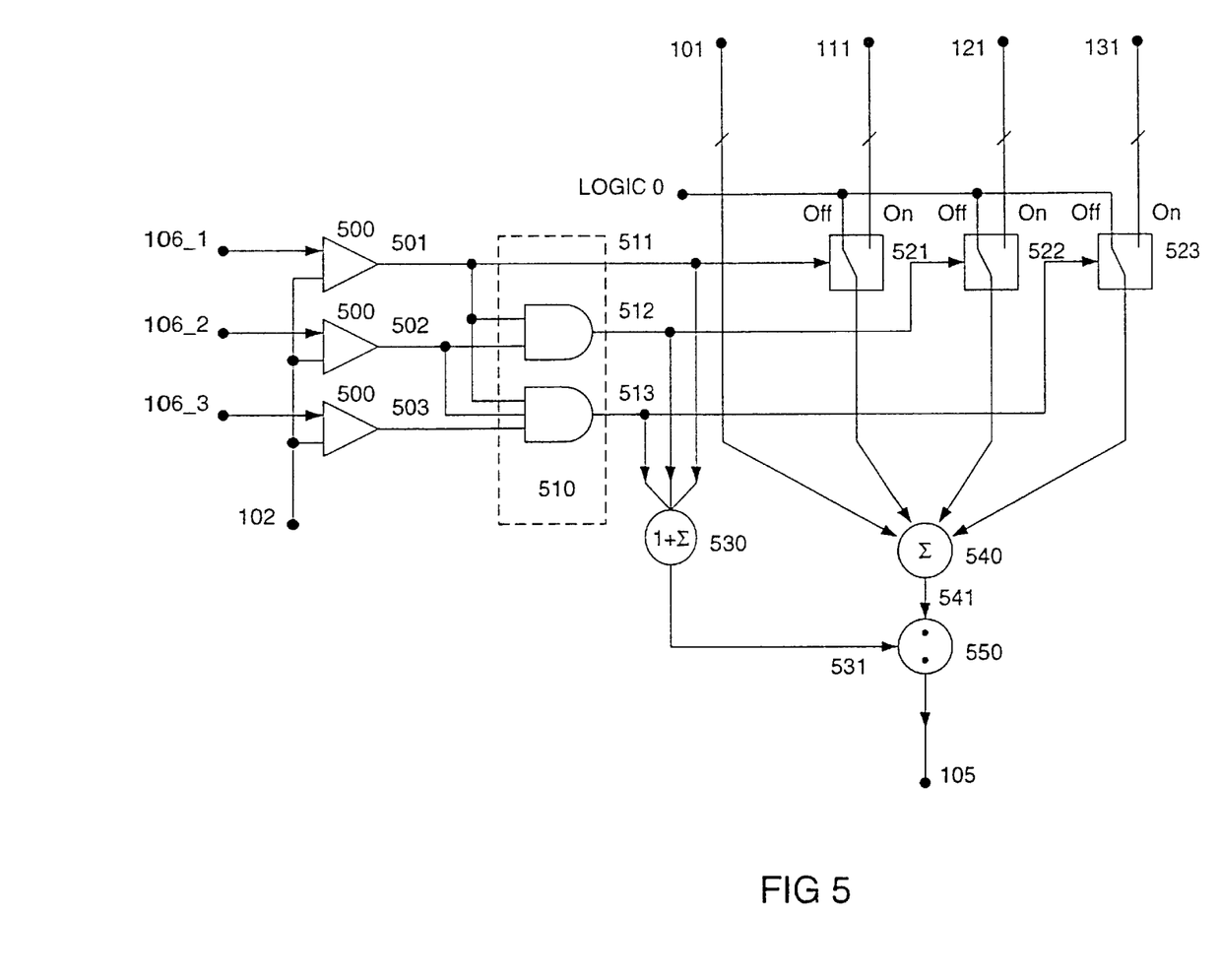
FIG. 5 is a logic schematic diagram of exemplary circuits for the adaptive temporal moving average filter implementation.

The circuit structure of the motion adaptive temporal filter is illustrated in FIG. 5. Each motion index value 106_1, 106_2 and 106_3 from the motion detection circuit is compared with a threshold 102. The comparison results are denoted as signal 501, 502 and 503 for frame1, frame2 and frame3, respectively. The signal 101 from present frame is directly connected to the adder 540 as one of its inputs. Video signals 111, 121 and 131 from the past three frames are connected to the adder circuit 540 via three switches 521, 522 and 523, respectively. When a switch is on, it allows the video signal to pass to the adder. The switches are controlled by the combinational logic of the three motion index values 511, 512 and 513. The logic functions are as follows. The comparison result 501, 502 or 503 is set to high when its corresponding motion index value is greater than the threshold 102; otherwise, it is set to low. The switch 521 is on only if 511 is low; otherwise, it is off. The switch 522 is on only if both 511 and 512 are low; otherwise, it is off. The switch 523 is on only if 511, 512 and 513 are low, otherwise, it is off. The sum 541 of the adder is supplied to the divider 550, and the divisor is the number of signals included in the adder 540. The quotient 105 of the divider is the result of the motion adaptive temporal filter, and this output would be the final filtered value of the target pixel or it would be fed into the detail/motion adaptive spatial filter.

Detail/Motion Adaptive Spatial Filter

Figure 6A:
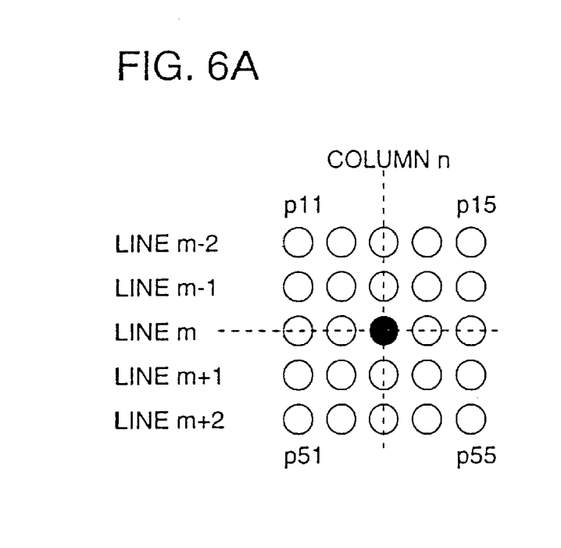
FIG. 6 is the pictorial representations of arrays of points presenting the pixels involved in processing and the mathematical expression of the processing algorithm.
Figure 6B:
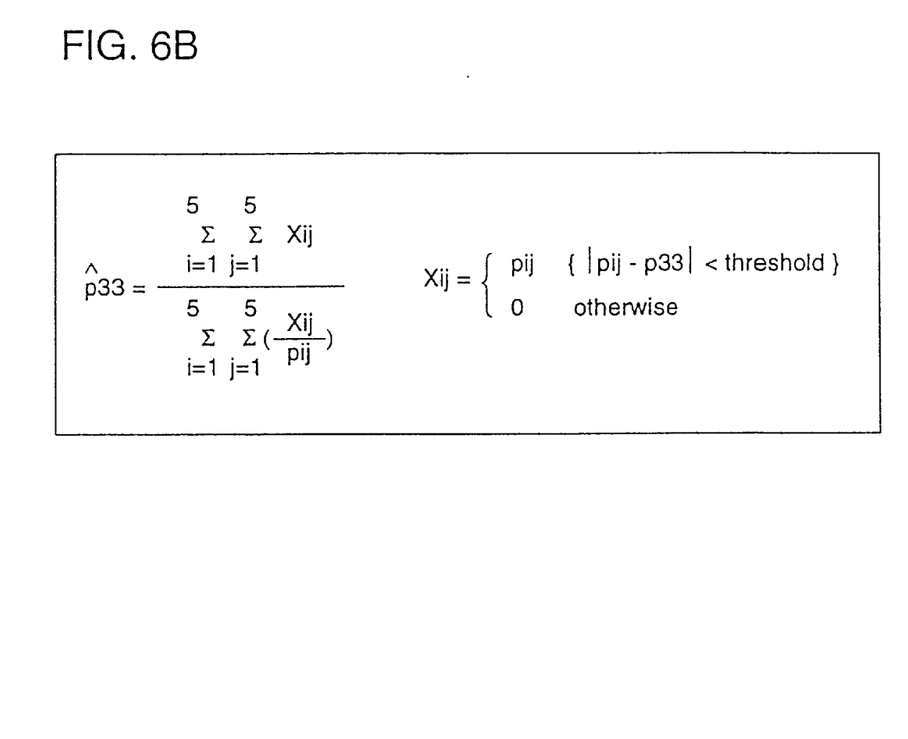
Figure 7:
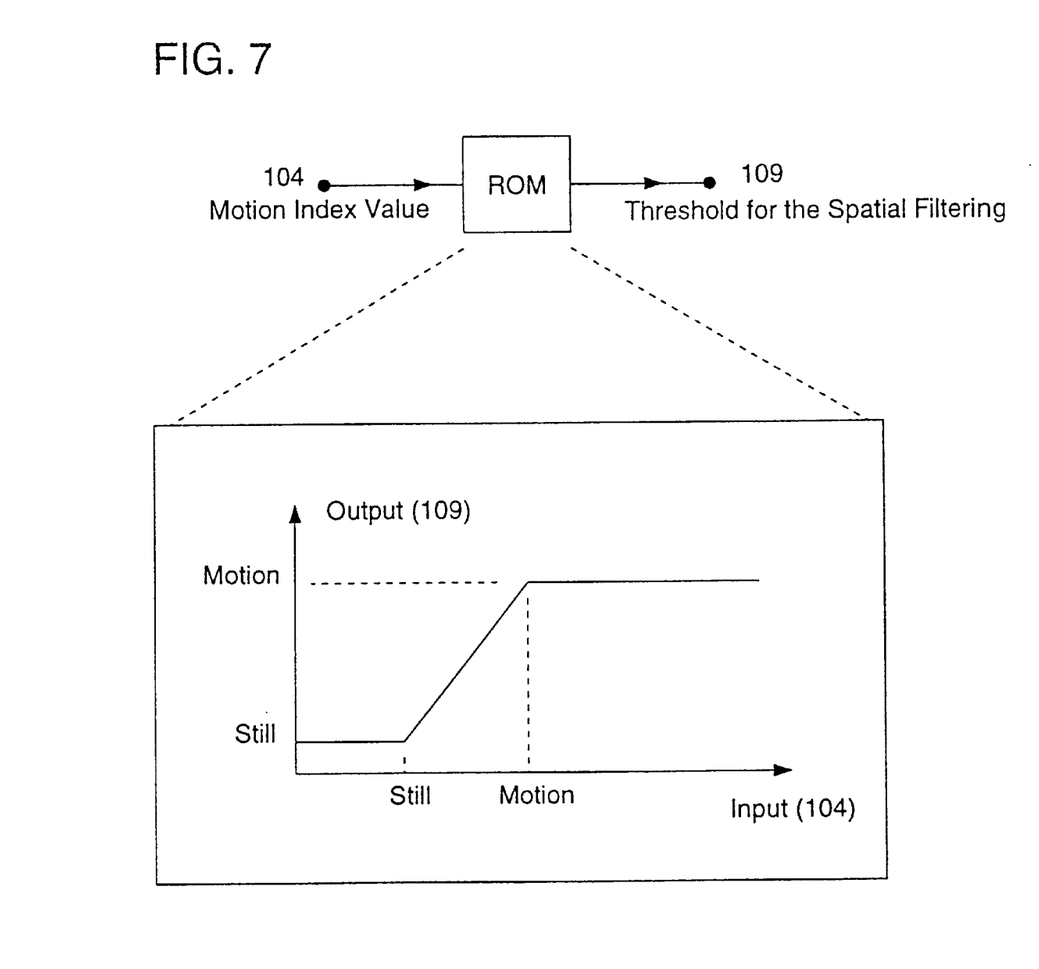
FIG. 7 is an exemplary circuit and a graphic representation that shows a typical relationship between the motion probability and the threshold value for the spatial soft switching.

The algorithm for the detail/motion adaptive spatial filter is illustrated in detail in FIGS. 6 and 7. The spatial filter operates on a m×n image window, where the m and n denotes the number of rows and the number of columns of the window respectively, with the target pixel as the central pixel. FIG. 6A illustrates a 5×5 window with the pixel at the location of m-th row and the n-th column as the target pixel. The circles represent pixels in the 5×5 window and the black one is the target pixel. Each pixel in the window is compared with the target pixel first. The spatial filter adds up all the pixels whose absolute difference with the target pixel is smaller than a threshold, and computes the average of all those pixels. Therefore, the spatial filter preserves fine detail and edge information while reducing the noise effectively. FIG. 6B shows a mathematical expression of the algorithm discussed above.

Aggressive spatial filtering (high value for the threshold) may cause smoothing effects, which appear as blurring of the picture. The level of the threshold is a trade off between preserving the fine details and reducing noise. To avoid degrading the picture quality, a common practice is to sacrifice noise reduction by setting the threshold to a fairly low level. Armed with the fact that human eyes are less sensitive to blurring when the picture is in motion, in this invention, the preferred circuit varies the threshold level as a function of the motion index value. The relationship between the threshold level and the motion index value is shown in FIG. 7. For picture areas which are still or have slow motion, the motion index value is expected to be low, and vice versa. When the motion index value is low, the threshold is set to a low level, therefore, the spatial filter does little noise reduction on still parts of the picture, and tries to preserve all the fine details. Although a small threshold results in less noise reduction, the overall noise reduction on these still parts of image is maintained because the temporal filter has achieved its maximum noise reduction on those pixels. For the motion parts of the picture, more aggressive spatial noise reduction process is done by increasing the threshold to high values. When the motion index value is between the high value and the low value, i.e. the target pixel is in an the area between motion and still the threshold is adjusted in between linears.

This dynamic thresholding technique can be easily implemented e.g. by a Read-Only-Memory (ROM) as shown in FIG. 7. The motion index value 104 controls the address lines of the ROM which outputs different threshold values according to the different motion index value inputs.

Figure 8:
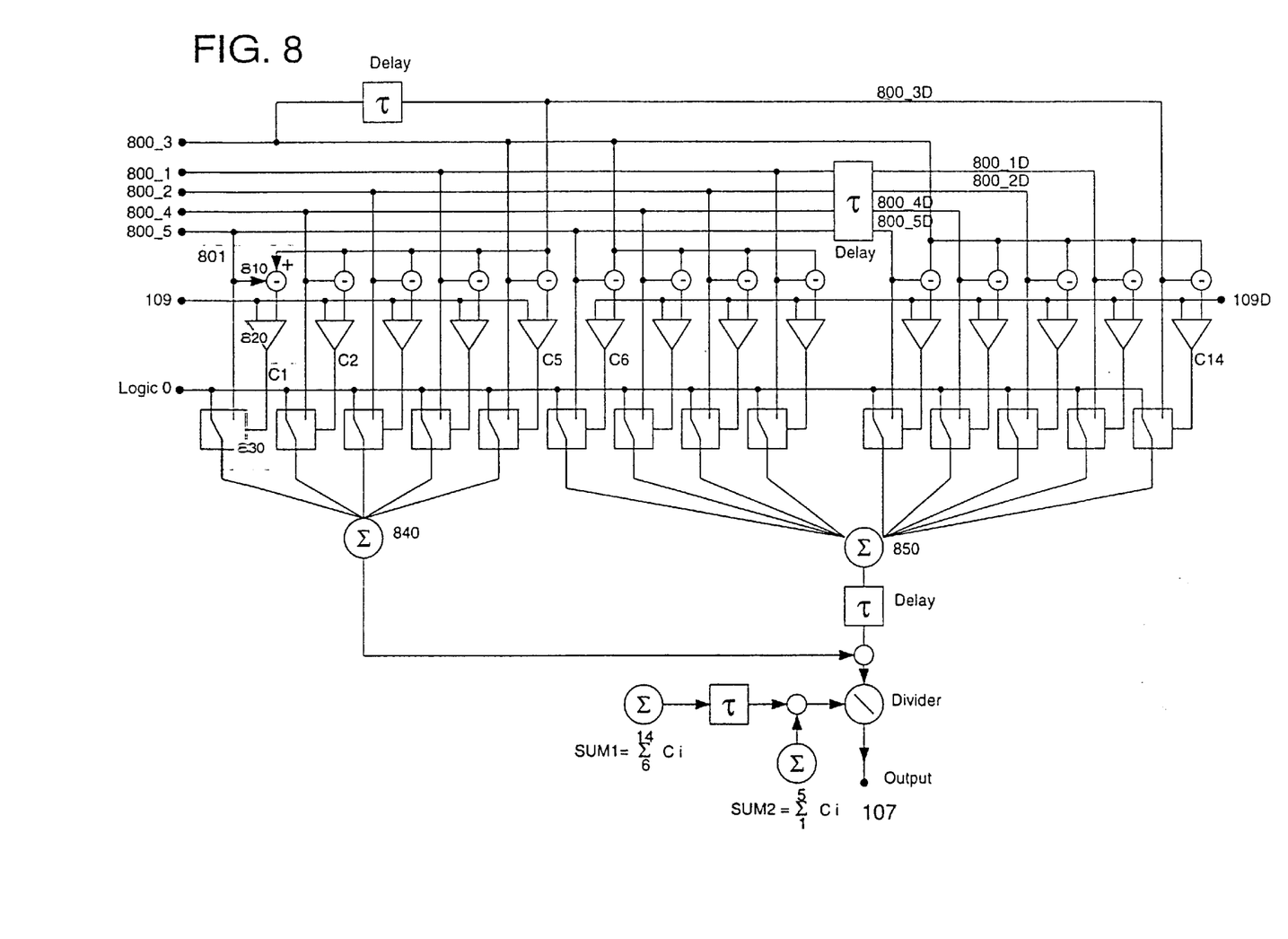
FIG. 8 is an exemplary logic schematic diagram of the parallel processing circuit. It is for 5×3 array processing, it can be easily expanded to mxn array processing.

FIG. 8 illustrates an exemplary circuitry which implements the attributes of the detail/motion adaptive spatial filter of FIG. 6. This example circuit operates on a five line by three column sub-array of the image filtered by the temporal filter of FIG. 5. Data inputs labeled 800_1 to 800_5 correspond to the line delayed signals 108_1 to 108_5 of FIG. 1. They represent vertically aligned five adjacent pixels in a frame. Both 800_3 and 800_3D, (suffix D indicates the signal is one-sample-period delayed), are considered as reference pixels.

Fourteen data selectors, C1 ... C14 (each consists of a subtracter 810, a comparator 820 and a data switch 830) are all similar and operate as follows. Refer to one of the data selector C1, the value of one of the reference pixels is coupled to the positive terminal of the subtracter 810 while one of the non-reference pixels is applied to the negative terminal of the subtracter 810. The difference produced by the subtracter 810 is then coupled to comparator 820 where it is compared with threshold 109.

Comparator 820 generates a logic one output if the absolute value of the difference is smaller than the threshold 109. The logic one will control switch 830 to let the data pass through for summation at the adder 840. If the absolute value of the difference is greater than the threshold 109, comparator 820 will output a zero to the control terminal of the switch 830 and turn off the switch. The data selector will then output a zero instead of passing the data through.

Nine data selectors C6–C14 choose data that the difference with reference pixel 800_3 is smaller than the threshold 109 among the five data 800_1D to 800_5D and four data 800_1, 800_2, 800_4, 800_5 to sum together at the adder 850. Five data selectors choose data that the difference with reference pixel 800_3D is less than the threshold 109 among the five data 800_1 to 800_5D to sum together at adder 840. Result from adder 850 is delayed by one sample period and then add with result from adder 840. This is the sum of all pixels in a five line by three columns sub-array window with reference pixel 800_3 in the center, which has a value close enough to the value of the center pixel 800_3. This sum is further divided by the number of pixels that have been summed up and obtain the average value 107.

Signal 107 is the output of the invented system.

Figure 9:
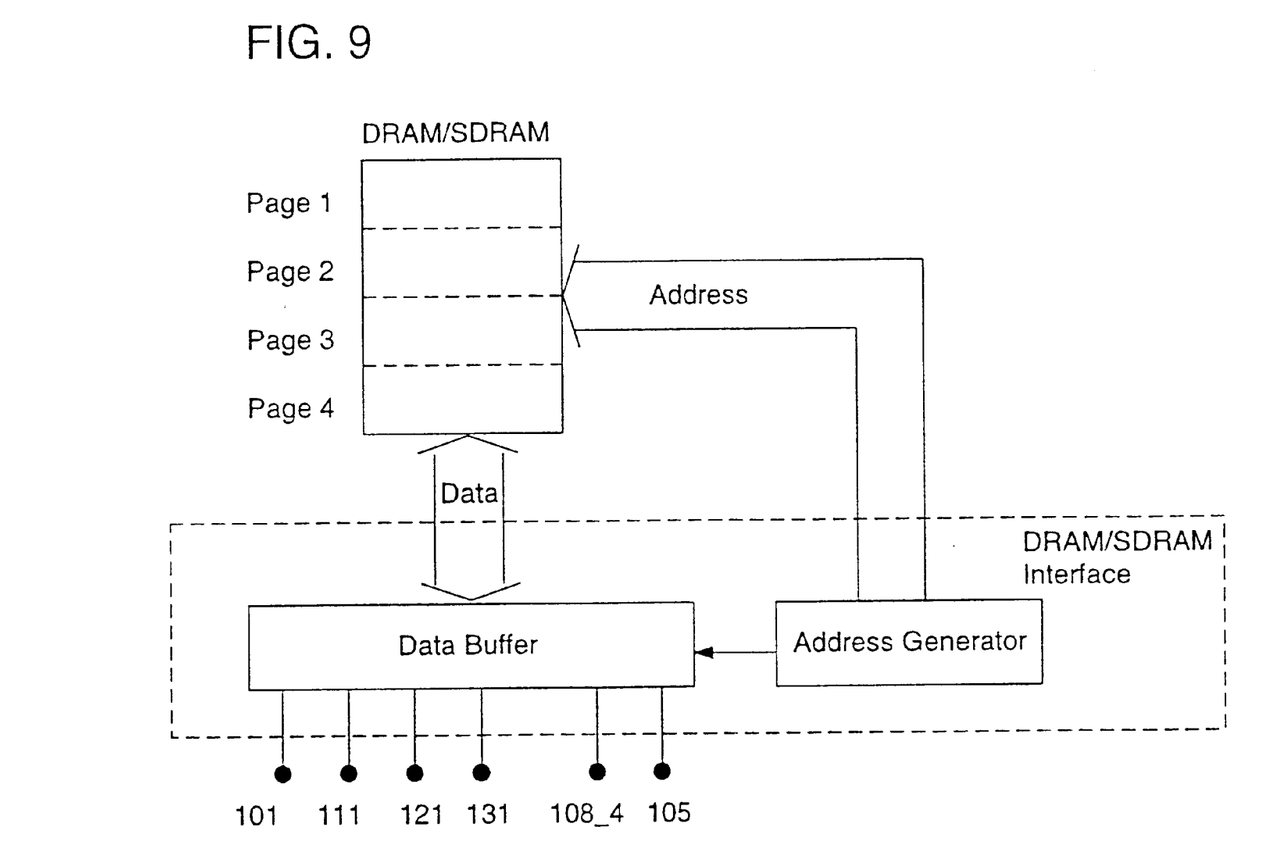
FIG. 9 demonstrates a digital TV set-top decoder application specific circuit design including DRAM paging and address generation block diagrams. This circuit can replace the frame delays and the field delay in FIG. 1.

This invention finds its applications in many fields. One of the applications is to combine this invention with cable digital set-top converter to improve the quality of the pictures in analog channels. FIG. 9 shows an example of the implementation of our noise reduction system using dynamic random access memory (DRAM) or synchronous dynamic access memory (SDRAM), which is a popular choice for today's set-top converter design. Signals 101, 111, 121, 131, 108_4 and 105 are corresponding to the signals of the same name in FIG. 1. To replace all three frame buffers and the one field buffer shown in the FIG. 1, this particular example circuit operates at four times of the speed of the pixel rate and divide the SDRAM/DRAM in to four segments for the three frames and one field storage. FIG. 10A shows the interface with an set-top digital decoder with analog demodulation. FIG. 10B is an example interface with set-top video decoder with digital demodulation.

It will be apparent that one of the preferred algorithms of the present invention is based on non-recursive temporal averaging utilizing the memories in a digital decoder set-top box or, taking the advantage of the continually decreasing memory's cost by having dedicated memories for more potential applications.

Having described the invention, modifications will be evident to those skilled in the art without departing from the scope of the invention as defined in the appended claims.

We claim:

1. A method of reducing noise in a video signal comprising providing a process frame with each of its pixels having a digital value applying a temporal motion detection step in sequence to target pixels in said process frame, said temporal motion detection step being based on difference in values between pixels corresponding to said target pixels in said process frame and a selected number of previous frames to define the status of each said target pixel with respect to the previous frames as a still pixel or a motion pixel, further processing each said motion pixel in an impulse recognition step to further define status of said motion pixels as either still pixels or retain their classification as motion pixels based on statuses of adjacent pixels in said frames, subjecting said target pixels to a spatial motion detection step based on weighting of statuses of said target pixels and adjacent pixels in said process frame and at least one of said previous frames to define a motion index for said target pixel.

2. A method of reducing noise in a video signal as defined in claim 1 wherein said temporal motion detecting step defines the status of each said target pixel with respect to each of said previous frame and said spatial motion detection step defines a motion index for said target pixel with respect to each of said previous frames.

3. A method of reducing noise in a video signal as defined in claim 1 wherein said method further comprises applying a motion adaptive temporal filter to said still pixels to define a pixel value for each of said still pixel, said motion adaptive temporal filter using said motion index values as a thresholds.

4. A method of reducing noise in a video signal as defined in claim 2 wherein said method further comprises applying a motion adaptive temporal filter to said still pixels to define a pixel value for each of said still pixel, said motion adaptive temporal filter using said motion index values as a thresholds.

5. A method of reducing noise in a video signal as defined in claim 1 wherein said method further comprises subjecting said motion pixels to a detailed motion adaptive spatial filter using a dynamic threshold based on said motion index value for said target pixels being processed.

6. A method of reducing noise in a video signal as defined in claim 2 wherein said method further comprises subjecting said motion pixels to a detailed motion adaptive spatial filter using a dynamic threshold based on said motion index value for said target pixels being processed.

7. A method of reducing noise in a video signal as defined in claim 3 wherein said method further comprises subjecting said motion pixels to a detailed motion adaptive spatial filter using a dynamic threshold based on said motion index value for said target pixels being processed.

8. A method of reducing noise in a video signal as defined in claim 4 wherein said method further comprises subjecting said motion pixels to a detailed motion adaptive spatial filter using a dynamic threshold based on said motion index value for said target pixels being processed.

\* \* \* \* \*